US011358208B2

(12) United States Patent
Tsuji (10) Patent No.: US 11,358,208 B2
(45) Date of Patent: Jun. 14, 2022

(54) HEAT EXCHANGER AND MANUFACTURING METHOD THEREFOR

(71) Applicant: NORITZ CORPORATION, Hyogo (JP)

(72) Inventor: Yuta Tsuji, Kobe (JP)

(73) Assignee: NORITZ CORPORATION, Hyogo (JP)

( * ) Notice: Subject to any disclaimer, the term of this patent is extended or adjusted under 35 U.S.C. 154(b) by 203 days.

(21) Appl. No.: 16/822,453

(22) Filed: Mar. 18, 2020

(65) Prior Publication Data

US 2020/0306815 A1 Oct. 1, 2020

(30) Foreign Application Priority Data

Mar. 25, 2019 (JP) .............................. JP2019-057407

(51) Int. Cl.
  *B21D 53/06* (2006.01)
  *B23K 1/00* (2006.01)
  *F24H 1/14* (2022.01)

(52) U.S. Cl.
  CPC ............ *B21D 53/06* (2013.01); *B23K 1/0012* (2013.01); *F24H 1/14* (2013.01)

(58) Field of Classification Search
  CPC ...... B21D 53/06; B21D 53/08; B23K 1/0012; F24H 1/14; F24H 1/36; F24H 1/40; F28F 2275/04; F28F 9/04; F28F 9/001; F28F 9/002; F28F 9/005; F28F 9/0219; F28F 9/0248; F28F 9/0231; F28F 9/0246; F28F 9/18; F28D 1/0477
  See application file for complete search history.

(56) References Cited

U.S. PATENT DOCUMENTS

| 4,528,733 A * | 7/1985 | Lord ..................... F16B 1/0014 165/905 |
| 10,295,281 B2 * | 5/2019 | Kasamatsu ............... F28F 9/26 |
| 10,890,356 B2 * | 1/2021 | Shiotsu ..................... F24H 1/41 |
| 11,054,195 B2 * | 7/2021 | Hokada ..................... F24H 1/41 |
| 2006/0254761 A1 * | 11/2006 | Watanabe ................. F28F 9/18 165/173 |

(Continued)

FOREIGN PATENT DOCUMENTS

JP 2018-119757 A 8/2018

*Primary Examiner* — Tho V Duong
(74) *Attorney, Agent, or Firm* — Studebaker & Brackett PC (57) ABSTRACT

A heat exchanger includes tube expansion portions provided respectively on a plurality of heat transfer tubes such that outer peripheral surfaces of the heat transfer tubes are respectively pressed against inner peripheral surfaces of a plurality of first holes provided in a side wall portion of a case, and a plurality of first concave surface portions provided in an outer surface of the tube expansion portion so that first gaps, into which brazing material of a first brazed portion advances, are formed between the outer surface of the tube expansion portion and the inner peripheral surface of the first hole. At least one of the plurality of first concave surface portions is positioned in an outside peripheral surface portion of the outer peripheral surface of the heat transfer tube. According to this configuration, the strength with which the heat transfer tubes are attached to the case can be increased while simplifying a manufacturing operation and reducing the manufacturing cost.

6 Claims, 7 Drawing Sheets

(56) References Cited

U.S. PATENT DOCUMENTS

| | | | |
|---|---|---|---|
| 2016/0288232 A1* | 10/2016 | Yoo | B23K 3/021 |
| 2016/0377348 A1* | 12/2016 | Fujisawa | F28F 9/001 |
| | | | 165/175 |
| 2018/0245817 A1* | 8/2018 | Okuda | F28F 9/182 |
| 2020/0103142 A1* | 4/2020 | Se | F24H 1/145 |

* cited by examiner

HEAT EXCHANGER AND MANUFACTURING METHOD THEREFOR

BACKGROUND OF THE INVENTION

Field of the Invention

The present invention relates to a heat exchanger used in water heating or the like in a water heater, for example, and a manufacturing method therefor.

Description of the Related Art

The present applicant previously proposed the invention described in Japanese Patent Application Publication No. 2018-119757 as an example of a heat exchanger.

In the heat exchanger described in this document, a plurality of heat transfer tubes are housed in a case to which combustion gas is supplied. End portions of the plurality of heat transfer tubes are drawn out to the exterior of the case from the interior by being passed through a plurality of holes provided in a side wall portion of the case. Further, a water inlet header portion and a hot water outlet header portion are attached to the end portions of the plurality of heat transfer tubes.

In a heat exchanger of this type, the plurality of heat transfer tubes must be securely fixed to the side wall portion of the case. Also, combustion gas must be prevented from leaking out to the exterior of the case from the interior. Conventionally, therefore, the heat transfer tubes are brazed to peripheral edge portions of the holes provided in the side wall portion.

In the prior art, however, there remains room for improvement in the following respect.

Simply brazing the respective heat transfer tubes to the side wall portion of the case may not be enough to sufficiently increase the strength with which the heat transfer tubes are attached to the side wall portion and thereby achieve an improvement in reliability. Increasing the brazing strength is therefore more desirable than ever.

Moreover, when brazing is implemented, paste-form brazing material is applied to the heat transfer tubes in advance, and this application operation is normally performed in a state where constituent members of the header portions are attached to the end portions of the heat transfer tubes. Accordingly, the constituent members of the header portions may interfere with the brazing material application operation. As a result, the workability of the brazing material application operation deteriorates, leading to an increase in operation cost and a corresponding increase in the cost of manufacturing the heat exchanger.

CITATION LIST

Patent Literature 1: Japanese Patent Application Publication No. 2018-119757

SUMMARY OF THE INVENTION

An object of the present invention is to provide a heat exchanger and a manufacturing method therefor, with which the strength with which a heat transfer tube is attached to a case can be increased by means of a simple configuration, leading to favorable effects such as simplification of the manufacturing operation and a reduction in manufacturing cost.

To solve the problem described above, the present invention employs the following technical means.

A heat exchanger provided by a first aspect of the present invention includes a case into which a heating medium is supplied, the case having a side wall portion in which a plurality of first holes are provided, a plurality of heat transfer tubes housed in the case and passed through the plurality of first holes so that respective end portions thereof are drawn out to the exterior of the case, header portions attached respectively to the end portions of the plurality of heat transfer tubes so that gaps are formed between the header portions and the side wall portion, a plurality of first brazed portions by which the plurality of heat transfer tubes are bonded to peripheral edge portions of the plurality of first holes, a tube expansion portion provided on each of the heat transfer tubes so that an outer surface thereof is pressed against an inner peripheral surface of the first hole, and a plurality of first concave surface portions provided in the outer surface of the tube expansion portion so as to form first gaps, which connect the interior of the side wall portion to the exterior and into which brazing material of the first brazed portions advances, between the outer surface of the tube expansion portion and the inner peripheral surface of the first hole. An outer peripheral surface of each heat transfer tube, when the side wall portion is seen from the front, is divided into an inside peripheral surface portion near a width direction center of the case and an outside peripheral surface portion on an opposite side thereto, and at least one of the plurality of first concave surface portions is positioned in the outside peripheral surface portion.

Here, the phrase "positioned in the outside peripheral surface portion" does not have to mean that one entire first concave surface portion is positioned in the outside peripheral surface portion and also includes a case in which only a part of one of the first concave surface portions is positioned in the outside peripheral surface portion, the remaining part being disposed so as to protrude from the outside peripheral surface portion.

Preferably, the respective end portions of the plurality of heat transfer tubes are arranged in two vertical columns with gaps therebetween in a vertical height direction of the case, the two vertical columns being provided in a staggered arrangement so that positions thereof deviate from each other in the vertical height direction, and at least one of the plurality of first concave surface portions is positioned below an uppermost portion and above an outermost end portion of the outside peripheral surface portion.

Here, regarding the phrase "positioned below an uppermost portion and above an outermost end portion", as long as a part of one of the first concave surface portions is positioned in the uppermost portion or the outermost end portion, the remaining part may be positioned in a region below the uppermost portion and above the outermost end portion.

Preferably, the tube expansion portion includes first and second step portions that are positioned respectively on the inside and the outside of the side wall portion so as to sandwich the side wall portion in an axial length direction of the heat transfer tube and that engage with the side wall portion, and each of the first concave surface portions extends to respective outer surfaces of the first and second step portions.

Preferably, the header portion includes a plurality of second holes into which the end portions of the plurality of heat transfer tubes are inserted, the header portion being bonded to the end portions via second brazed portions, the tube expansion portion is provided such that the outer surface thereof is also pressed against an inner peripheral surface of the second hole, and the heat exchanger according to the present invention further includes second concave surface portions provided in the outer surface of the tube expansion portion so as to form second gaps, into which brazing material of the second brazed portion advances, between the outer surface of the tube expansion portion and the inner peripheral surface of the second hole.

Preferably, each of the heat transfer tubes has a meandering shape.

Preferably, the heating medium is combustion gas.

A manufacturing method for a heat exchanger provided by a second aspect of the present invention includes a tube expansion step for providing a tube expansion portion on each of a plurality of heat transfer tubes in a state where end portions of the plurality of heat transfer tubes are respectively inserted into a plurality of first holes provided in a side wall portion of a case, into which a heating medium is supplied, such that outer peripheral surfaces of the plurality of heat transfer tubes are respectively pressed against inner peripheral surfaces of the plurality of first holes, a header portion attaching step for attaching header portions or constituent members of the header portions to the end portions of the plurality of heat transfer tubes so that gaps are formed between the header portions and the side wall portion, a brazing step for providing first brazed portions by which the plurality of heat transfer tubes are bonded to peripheral edge portions of the plurality of first holes, and a first concave surface portion forming step for forming a plurality of first concave surface portions in an outer surface of the tube expansion portion before the brazing step so as to form first gaps, which connect the interior of the side wall portion to the exterior, between the outer surface of the tube expansion portion and the inner peripheral surface of the first hole. The outer peripheral surface of each heat transfer tube, when the side wall portion is seen from the front, is divided into an inside peripheral surface portion near a width direction center of the case and an outside peripheral surface portion on an opposite side thereto, and in the first concave surface portion forming step, at least one of the plurality of first concave surface portions is positioned in the outside peripheral surface portion. In the brazing step, brazing material used to form the first brazed portion is applied to the first concave surface portion positioned in the outside peripheral surface portion of the heat transfer tube from the outside of the case, and the molten brazing material is caused to advance into the first gap.

Preferably, the tube expansion step is performed using a divided punch having an expandable and contractable portion capable of expanding and contracting in a radial direction of the heat transfer tube while inserted into the heat transfer tube, the expandable and contractable portion includes a plurality of segments for pressing the heat transfer tube from the inside thereof, the plurality of segments being configured such that during expansion of the heat transfer tube, separated portions are formed between respective outer surface portions of the plurality of segments, and using the separated portions, the first concave surface portions are provided in the outer surface of the tube expansion portion, and the tube expansion step and the first concave surface portion forming step are executed simultaneously.

Preferably, in the header portion attaching step, prior to the tube expansion step, the end portions of the plurality of heat transfer tubes are inserted into a plurality of second holes provided in the header portion, in the tube expansion step, the tube expansion portion is provided so that the outer peripheral surfaces of the end portions of the respective heat transfer tubes are also pressed against inner peripheral surfaces of the respective second holes, and second concave surface portions are provided in the outer surface of the tube expansion portion so as to form second gaps between the outer surface of the tube expansion portion and the inner peripheral surface of the second hole, and in the brazing step, second brazed portions by which the plurality of heat transfer tubes are bonded to peripheral edge portions of the respective second holes are provided, and molten brazing material used to form the second brazed portions is caused to advance into the second gap.

Other features and advantages of the present invention will become more apparent from the embodiments of the invention, to be described below with reference to the attached figures.

DETAILED DESCRIPTION OF THE PREFERRED EMBODIMENTS

Preferred embodiments of the present invention will be described specifically below with reference to the figures.

A heat exchanger HE shown in FIGS. 1 to 4B is incorporated into a water heater, for example, and used to heat water to be heated for use in a hot water supply. The heat exchanger HE has an identical overall basic configuration to the heat exchanger described in Japanese Patent Application Publication No. 2018-119757, and includes a case 1, a plurality of heat transfer tubes 2 housed in the case 1, and a pair of header portions 6 (6a, 6b) serving respectively as a water inlet header portion and a hot water outlet header portion. Known configurations shared with Japanese Patent Application Publication No. 2018-119757 will be described briefly.

The case 1 has a substantially rectangular parallelepiped shape overall, and includes a substantially angular tube-shaped case main body 1A that is open at both ends in a lateral width direction, and a pair of side wall portions 10, 10A bonded to the case main body 1A so as to block the open parts at the two ends of the case main body 1A. The case main body 1A and the pair of side wall portions 10, 10A are respectively formed by implementing pressing, bending, or the like on stainless steel plate, for example. An intake port 17 and an exhaust port 18 through which combustion gas serving as a heating medium flows into and out of the case 1 are provided respectively in a rear wall portion 1a and a front wall portion 1b of the case main body 1A. Water to be heated passing through the plurality of heat transfer tubes 2 is heated using the combustion gas, whereby hot water is generated. Step-press portions 19, 19A are provided on the side wall portions 10, 10A to increase the strength of the side wall portions 10, 10A.

Each heat transfer tube 2 is a meandering tube having a meandering shape when seen from above, for example, and the heat transfer tube 2 is formed by connecting a plurality of straight tube body portions 2a arranged with gaps therebetween in series via connecting tube body portions 2b having a semicircular arc shape or the like. The plurality of heat transfer tubes 2 are stacked in a vertical height direction, but heat transfer tubes 2 that are adjacent to each other in the vertical height direction are arranged so that the positions thereof deviate from each other by an appropriate dimension in a front-rear direction of the case 1. This configuration is effective in increasing the amount of heat recovered from the combustion gas by the plurality of heat transfer tubes 2.

Figure 1:
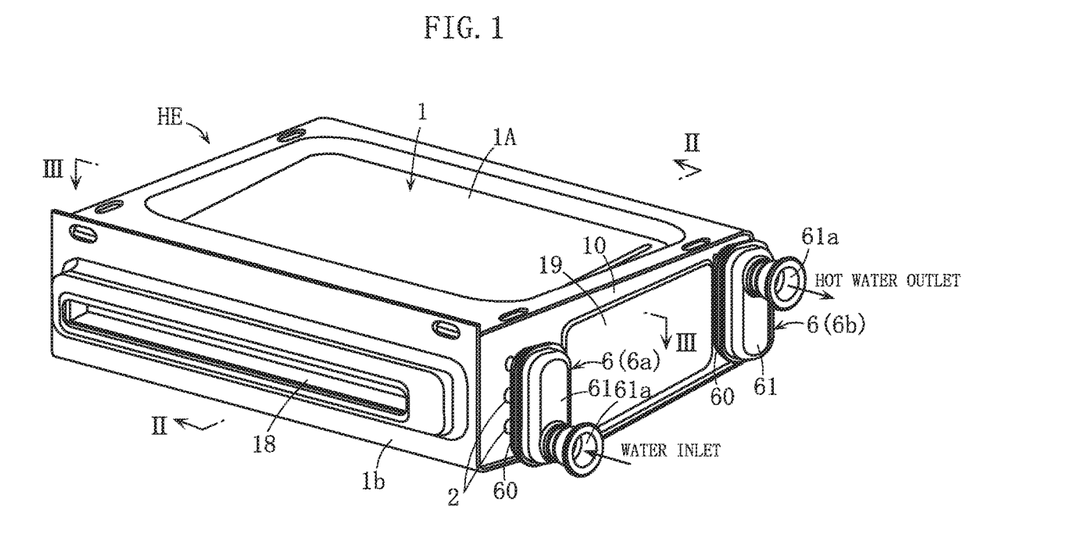
FIG. 1 is a perspective view showing an example of a heat exchanger according to the present invention.
Figure 2:
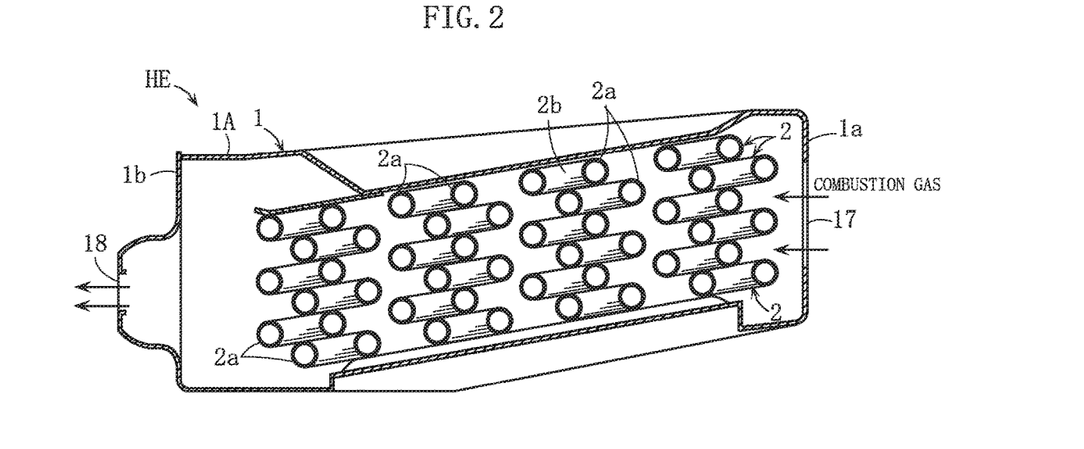
FIG. 2 is a II-II sectional view of FIG. 1.
Figure 3:
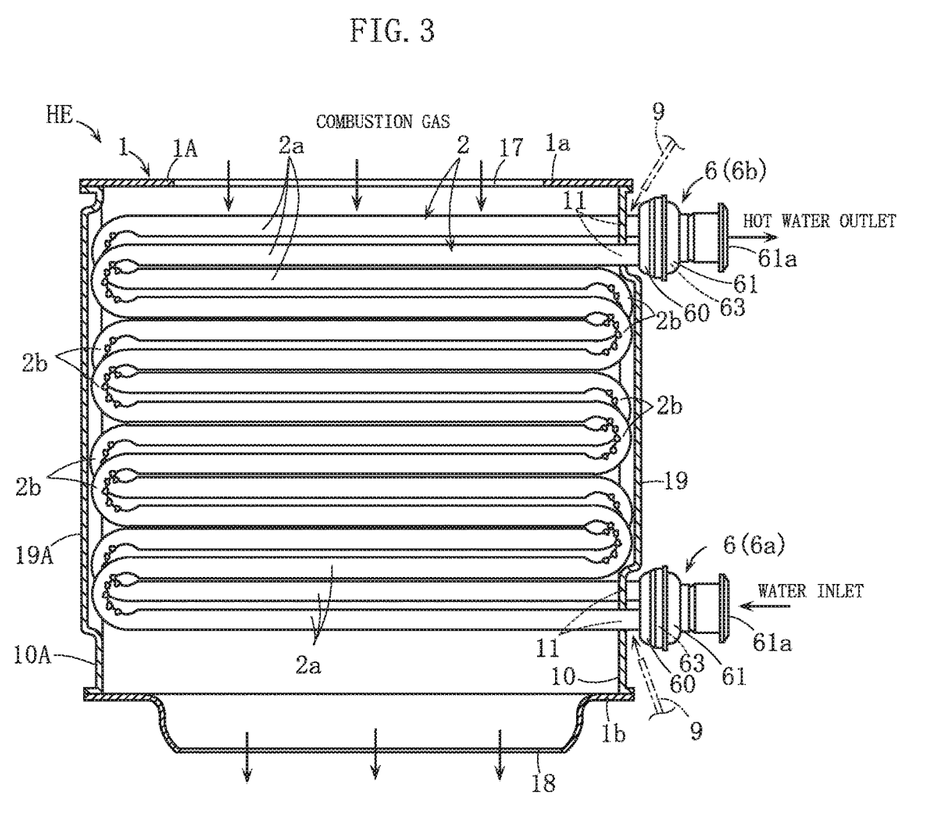
FIG. 3 is a sectional view of FIG. 1.
Figure 4A:
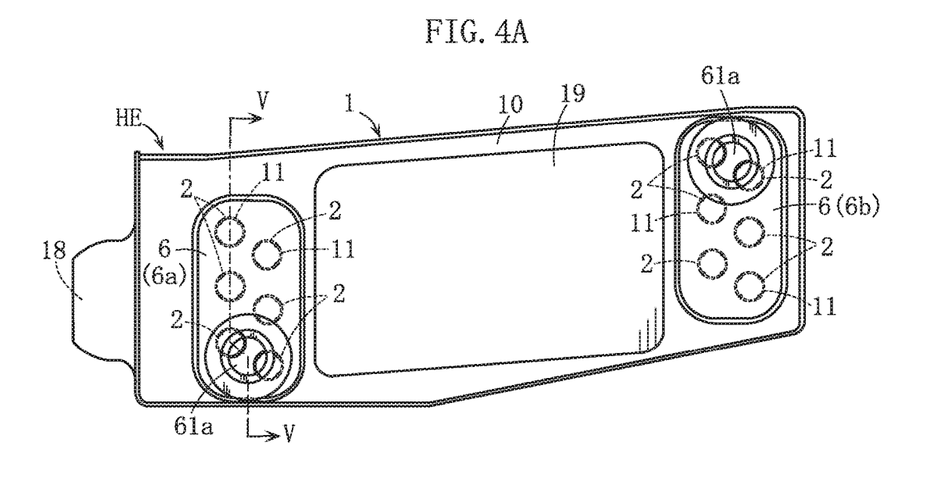
FIG. 4A is a side view of the heat exchanger shown in FIG. 1.
Figure 4B:
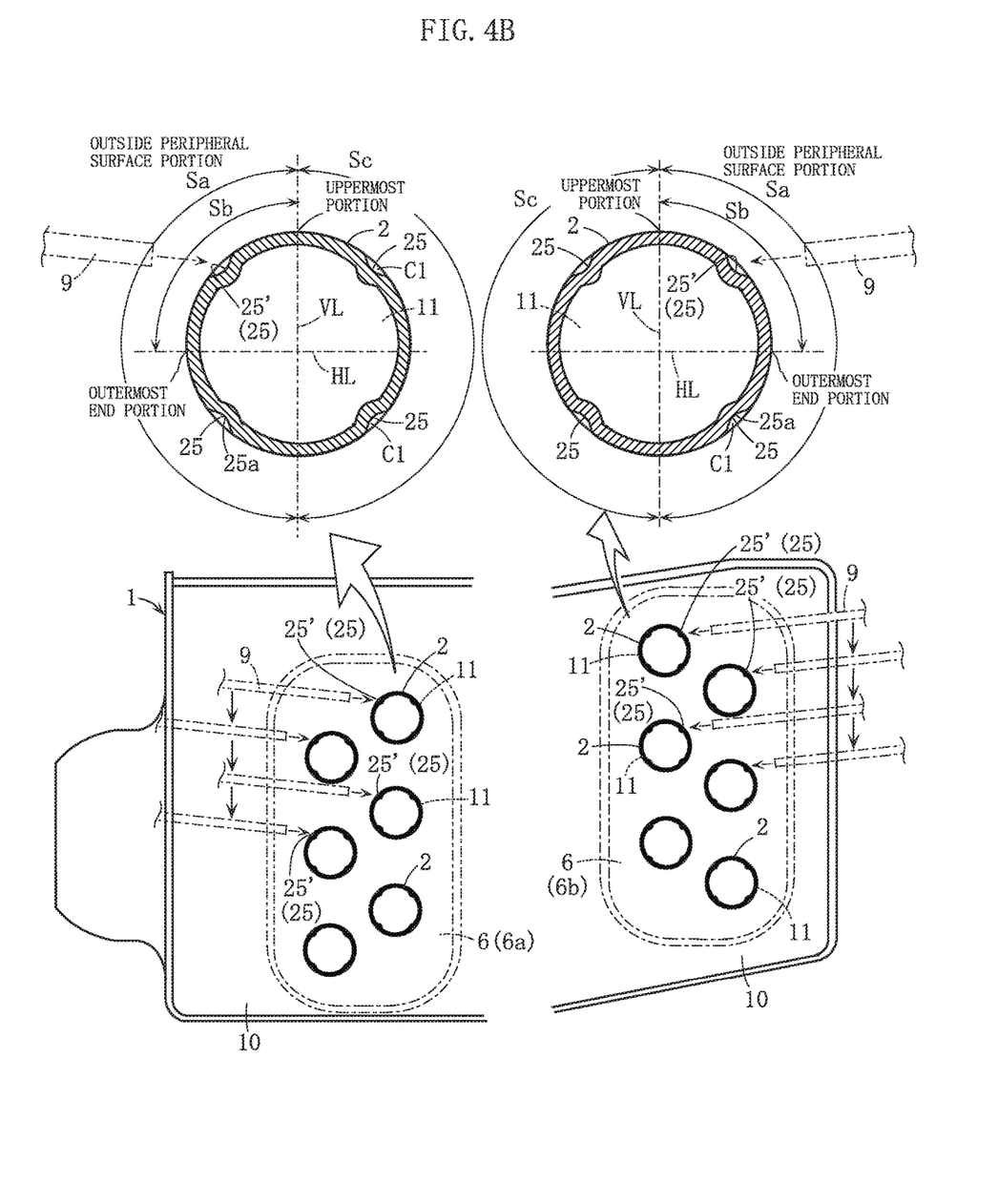
FIG. 4B is an illustrative sectional view thereof.
Figure 5:
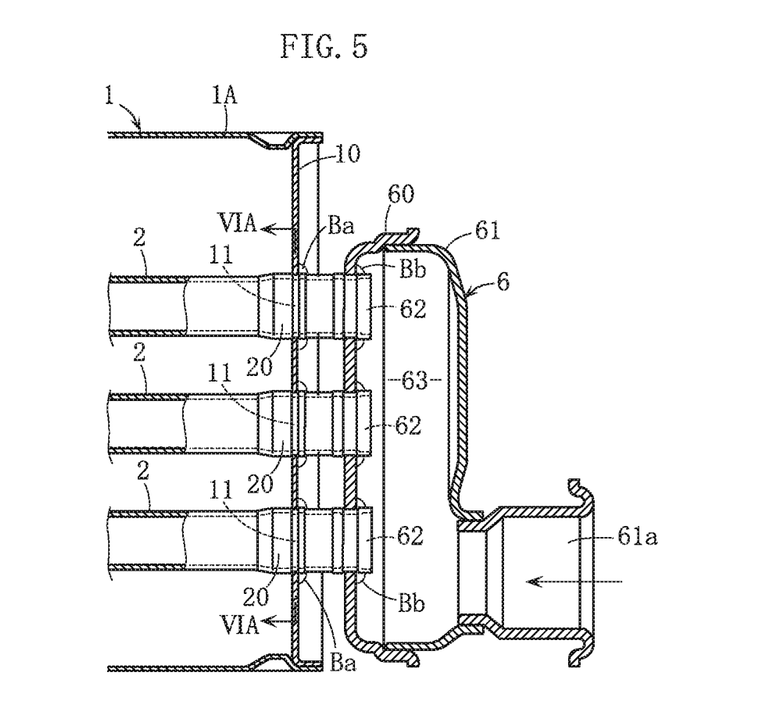
FIG. 5 is a V-V sectional view of FIG. 4A.

Respective end portions (longitudinal direction end portions) of the plurality of heat transfer tubes 2 are drawn out to the exterior of the case 1 from the interior by being passed through a plurality of first holes 11 provided in the side wall portion 10 of the case 1. The plurality of first holes 11 are provided in regions on the front side and rear side of the step-press portion 19 so as to avoid the step-press portion 19. As shown in FIGS. 4A and 4B, the plurality of first holes 11 and the respective end portions of the heat transfer tubes 2 are arranged in two vertical columns with gaps therebetween in the vertical height direction of the case 1, and the two vertical columns are provided in a staggered arrangement so that the positions thereof deviate from each other in the vertical height direction.

The header portions 6 are each formed by bonding a base portion 60 to a cover portion 61 having an opening portion 61a used as a water inlet or a hot water outlet, and a chamber 63 that communicates with the interiors of the heat transfer tubes 2 is formed in the interior of the header portion 6. The header portions 6 are attached to the plurality of heat transfer tubes 2. A gap (used as a brazing material application gap) is formed between each header portion 6 and the side wall portion 10.

A structure for fixing the heat transfer tubes 2 to the side wall portion 10 and a structure for attaching the header portions 6 to the heat transfer tubes 2 are features of this embodiment and will be described below.

As shown in FIGS. 5 to 8 (particularly FIG. 7), each heat transfer tube 2 is provided with a tube expansion portion 20. Further, a first brazed portion Ba is provided as means for bonding the heat transfer tube 2 to the side wall portion 10 of the case 1.

Figure 6A:
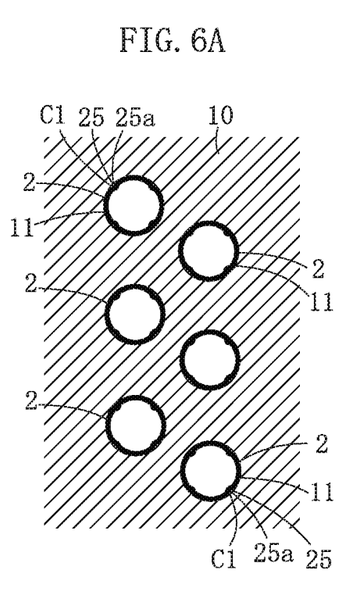
FIG. 6A is a VIA-VIA sectional view of FIG. 5.
Figure 6B:
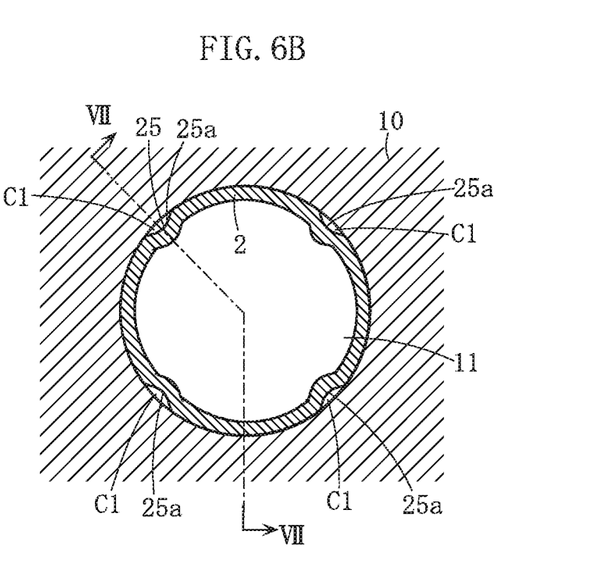
FIG. 6B is a partially enlarged view of FIG. 6A.
Figure 8:
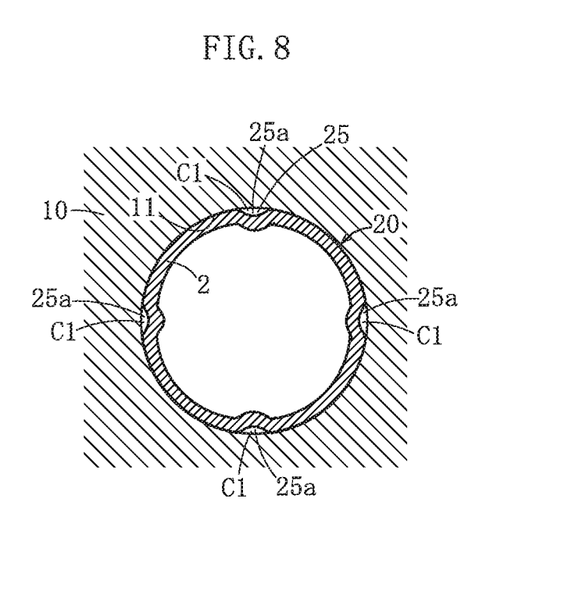
FIG. 8 is a VIII-VIII sectional view of FIG. 7.

The tube expansion portion 20 is provided on the heat transfer tube 2 from a position further inward than the side wall portion 10 of the case 1 to a tip end portion, and includes first to fourth step portions 21 to 24 and concave surface portions 25 including first and second concave surface portions 25a, 25b. The concave surface portions 25 correspond to unexpanded portions and are provided in series in an axial length direction of each heat transfer tube 2. The concave surface portions 25 are sites corresponding to separated portions 55 of a divided punch 5 used in a tube expansion operation, to be described below with reference to FIGS. 9A to 9C, and as shown in FIGS. 4B, 6B, and 8, the concave surface portions 25 are provided in a plurality of locations at appropriate intervals in a circumferential direction of the heat transfer tube 2. In FIGS. 4B, 6B, and 8, the concave surface portions 25 are arranged differently, but this is because FIGS. 4B and 6B correspond to lateral sectional views of the heat exchanger HE and show the actual configuration thereof, whereas FIG. 8 is a sectional view clarifying the relationship with the divided punch 5 shown in FIGS. 9A to 9C, and to facilitate understanding of the tube expansion operation and so on, to be described below, in FIG. 8, one of the concave surface portions 25 is positioned in an uppermost portion of an outer peripheral surface of the heat transfer tube 2.

In actuality, as shown in FIG. 4B, the plurality of concave surface portions 25 are provided in a total of four locations at equal angular intervals of approximately 90° in the outer peripheral surface of each heat transfer tube 2, and the positions thereof deviate by an appropriate angle (approximately 45°, for example) from a horizontal line HL or a vertical line VL passing through the center of the heat transfer tube 2. Meanwhile, the outer peripheral surface of the heat transfer tube 2, when viewing the side wall portion 10 from the front, is divided into an inside peripheral surface portion Sc near the width direction center of the case 1 and an outside peripheral surface portion Sa on the opposite side thereto. At least one of the plurality of concave surface portions 25 provided in each heat transfer tube 2 is positioned in some part of the outside peripheral surface portions Sa of the outer peripheral surface of the heat transfer tube 2 when the side wall portion 10 is seen from the front.

The concave surface portion 25 (25') shown in FIG. 4B is positioned in the outside peripheral surface portion Sa of the heat transfer tube 2 in a region Sb below the uppermost portion and above an outermost end portion. This concave surface portion 25' is used as a brazing material application subject region.

The first and second step portions 21, 22 are parts that are positioned respectively on the inside and the outside of the side wall portion 10 of the case 1 so as to sandwich the side wall portion 10 in the axial length direction of the heat transfer tube 2, and are configured to have a larger diameter than an outer diameter of the unexpanded tube portions of the heat transfer tube 2. The first and second step portions 21, 22 are preferably disposed in contact respectively with both inside and outside surfaces of the side wall portion 10.

Figure 7:
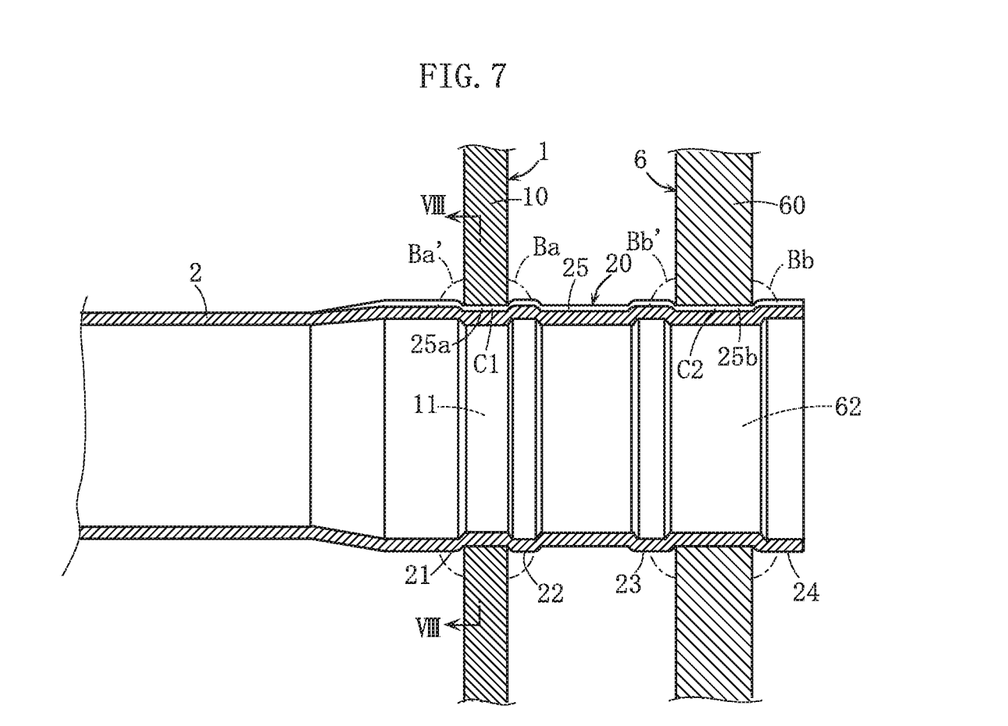
FIG. 7 is a VII-VII sectional view of FIG. 6B.

As shown in FIGS. 7 and 8, an outer peripheral surface of the tube expansion portion 20 (an outer peripheral surface of a region between the first and second step portions 21, 22) is pressed against the inner peripheral surface of the first hole 11. Note, however, that in the positions of the first concave surface portion 25a, the outer peripheral surface of the tube expansion portion 20 and the inner peripheral surface of the first hole 11 are not in contact, and first gaps C1 are formed therebetween. Parts of the concave surface portions 25 opposing the inner peripheral surface of the first hole 11 respectively form the first concave surface portions 25a, and the first concave surface portions 25a also extend to formation locations of the first and second step portions 21, 22.

The first brazed portion Ba is a part for bonding a peripheral edge portion of the first hole 11 of the side wall portion 10 to the outer peripheral surface of each of the heat transfer tubes 2, and is provided on the outside of the side wall portion 10. Note that the brazing material of the first brazed portion Ba advances into the first gaps C1 so as to bond the inner peripheral surface of the first hole 11 to the outer peripheral surface of each of the heat transfer tubes 2. Preferably, some of the brazing material reaches the inside surface of the side wall portion 10 through the first gaps C1 so as to form an additional brazed portion Ba' for bonding the inner surface side of the side wall portion 10 to the heat transfer tube 2.

A part of the heat transfer tube 2 near the tip end is inserted into a second hole 62 provided in the base portion 60 of the header portion 6, and a second brazed portion Bb is provided as means for bonding these parts. The third and fourth step portions 23, 24 of the tube expansion portion 20 are parts positioned respectively on the inside and the outside of the base portion 60 in the axial length direction of each of the heat transfer tubes 2 and configured to have a larger diameter than the outer diameter of the unexpanded portions of each of the heat transfer tubes 2. The third and fourth step portions 23, 24 are preferably disposed in contact with both inside and outside surfaces of the base portion 60.

The outer peripheral surface of the tube expansion portion 20 is also pressed against an inner peripheral surface of the second hole 62. Note, however, that in positions of the second concave surface portions 25b, the outer peripheral surface of the tube expansion portion 20 and the inner peripheral surface of the second hole 62 are not in contact, and second gaps C2 are formed therebetween. Parts of the concave surface portions 25 opposing the inner peripheral surface of the second hole 62 respectively form the second concave surface portions 25b. The second concave surface portions 25b also extends to formation locations of the third and fourth step portions 23, 24.

The second brazed portion Bb is a part for bonding a peripheral edge portion of the second hole 62 of the base portion 60 to the outer peripheral surface of each of the heat transfer tubes 2, and is provided on one surface side of the base portion 60. Note that the brazing material of the second brazed portion Bb advances into the second gaps C2 so as to bond the inner peripheral surface of the second hole 62 to the outer peripheral surface of the heat transfer tube 2. Preferably, some of the brazing material reaches the opposite surface side of the base portion 60 to the aforesaid surface side through the second gaps C2 so as to form additional brazed portions Bb' for bonding the opposite surface side of the base portion 60 to the heat transfer tube 2.

Next, an example of a method for manufacturing the above heat exchanger HE will be described.

Figure 9A:
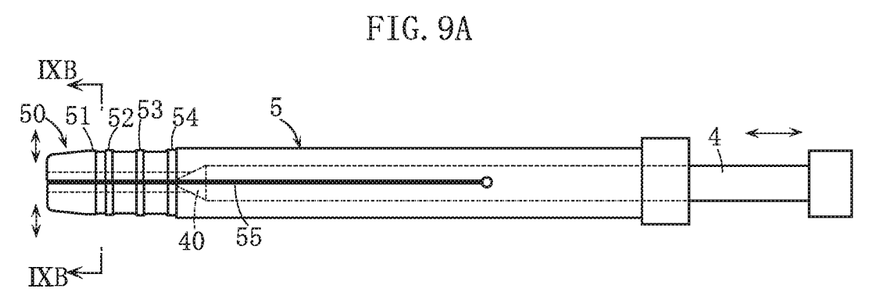
FIG. 9A is a front view showing an example of a divided punch used to expand a heat transfer tube.
Figure 9B:
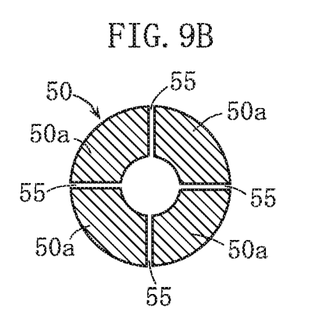
FIG. 9B is a IXB-IXB sectional view of FIG. 9A.
Figure 9C:
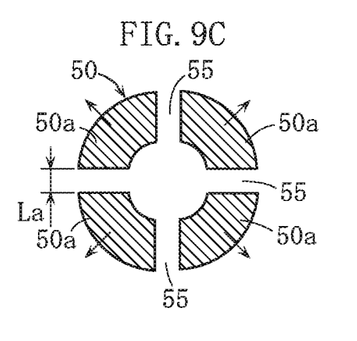
FIG. 9C is a sectional view showing main parts of an action performed by the structure shown in FIG. 9B.

The divided punch 5 shown in FIGS. 9A to 9C is used to manufacture the heat exchanger HE. To facilitate understanding, the divided punch 5 will be described first.

The divided punch 5 is formed in a tubular shape with a mandrel 4 inserted into the interior thereof and includes a plurality of slits 55 (the separating portions) extending from a tip end portion toward a base end portion side. As a result, the divided punch 5 is divided into a plurality of (four, for example) segments 50a about the central axis thereof. A part of the divided punch 5 near the axial length direction tip end serves as an expandable and contractable portion 50 capable of expanding and contracting in a radial direction. First to fourth convex portions 51 to 54 for forming the first to fourth step portions 21 to 24 described above are provided on an outer peripheral surface of the expandable and contractable portion 50.

A tip end portion of the mandrel 4 serves as a wedge portion 40 that is formed in a conical shape or a truncated conical shape, for example, and has a diameter or a width that increases gradually from the tip end portion to the base end portion side, and is positioned inside the expandable and contractable portion 50 of the divided punch 5. When the mandrel 4 is caused to advance relative to the divided punch 5, the expandable and contractable portion 50 shifts from an unexpanded state shown in FIG. 9B to an expanded state shown in FIG. 9C. In other words, the plurality of segments 50a can be pushed out by the wedge portion 40. In the expanded state shown in FIG. 9C, a width La of the slits 55 (the separating portions) increases, and as a result, the concave surface portion 25 can be formed in the tube expansion portion 20 of each of the heat transfer tubes 2.

When manufacturing the heat exchanger HE, the divided punch 5 described above is used to implement procedures such as those shown in FIGS. 10A to 12B.

Figure 10A:
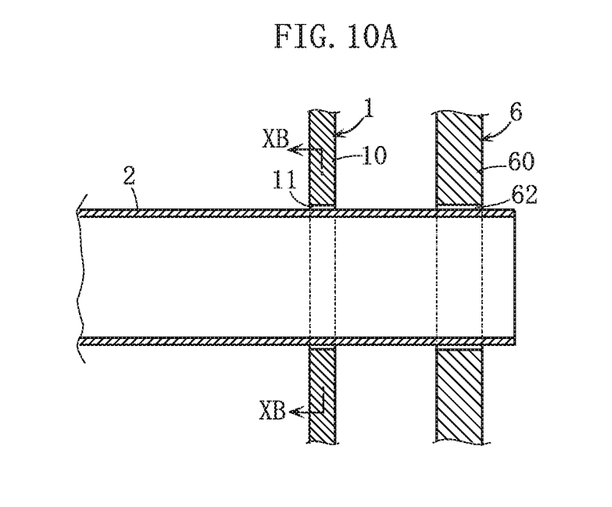
FIG. 10A is a sectional view showing main parts of example operation processes of a manufacturing method for the heat exchanger shown in FIGS. 1 to 4B.
Figure 10B:
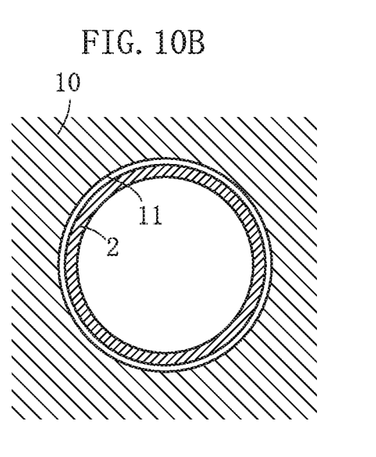
FIG. 10B is a XB-XB sectional view of FIG. 10A.
Figures 11A, 11B:
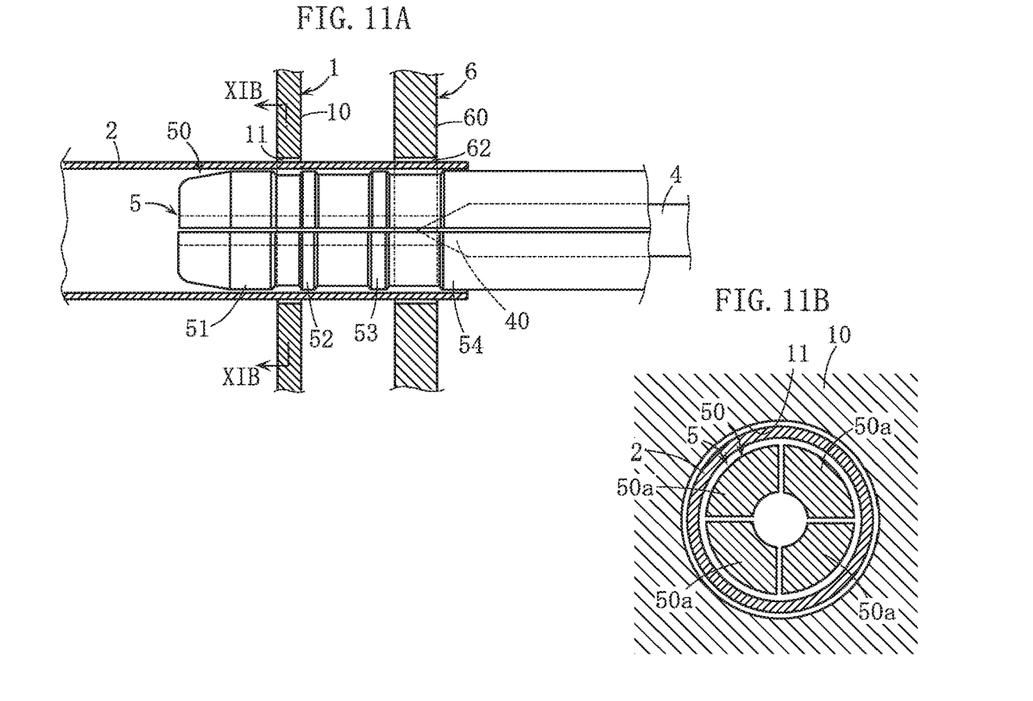
FIG. 11A is a sectional view showing main parts of example operation processes of the manufacturing method for the heat exchanger shown in FIGS. 1 to 4B.
FIG. 11B is a XIB-XIB sectional view of FIG. 11A.
Figure 12A:
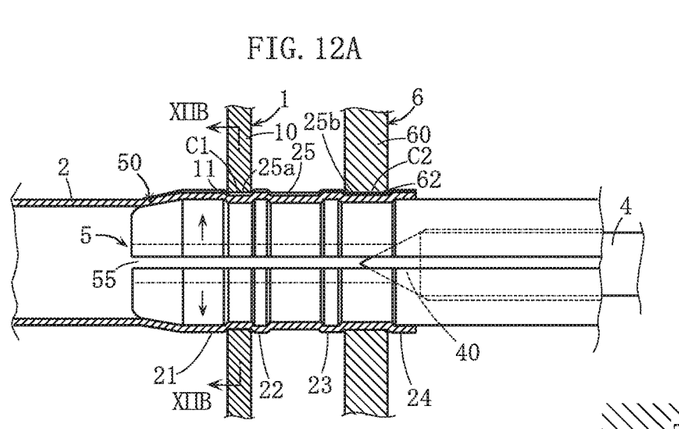
FIG. 12A is a sectional view showing main parts of example operation processes of the manufacturing method for the heat exchanger shown in FIGS. 1 to 4B.
Figure 12B:
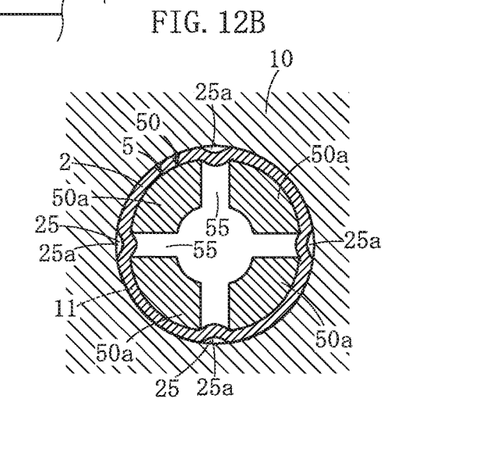
FIG. 12B is a XIIB-XIIB sectional view of FIG. 12A.

First, in a state where each of the heat transfer tubes 2 is inserted into the first and second holes 11, 62 provided respectively in the side wall portion 10 of the case 1 and the base portion 60 of the header portion 6, as shown in FIGS. 10A and 10B, the divided punch 5 is inserted into each of the heat transfer tubes 2, as shown in FIGS. 11A and 11B. Next, as shown in FIGS. 12A and 12B, the divided punch 5 is expanded in order to expand the region near the end portion of each of the heat transfer tubes 2. In so doing, the tube expansion portion 20 described with reference to FIGS. 4B, 6B to 8, and so on, can be provided on the heat transfer tube 2. Further, the heat transfer tube 2 can be fixed provisionally to the side wall portion 10 and the base portion 60 can be fixed provisionally to the heat transfer tube 2 appropriately.

As is evident from FIG. 12B, when the expandable and contractable portion 50 of the divided punch 5 is expanded, the width of the slits 55 (the separating portions) between the plurality of segments 50a increases such that locations corresponding to the slits 55 are either not expanded or substantially not expanded in comparison with other parts. As a result, the concave surface portions 25 can be provided in the tube expansion portion 20.

Once the tube expansion process described above is complete, a brazing process is implemented to provide the first and second brazed portions Ba, Bb. In the brazing process, first, an operation for applying paste-form brazing material is performed. As indicated by virtual lines in FIG. 3, a brazing material application operation for forming the first brazed portion Ba is performed by inserting a brazing material application nozzle 9 into the gap between the side wall portion 10 and the base portion 60 from the outside of the case 1. Further, at this time, as shown in FIG. 4B, brazing material is applied to the position of the concave surface portion 25'. This brazing material application operation can be performed easily.

A brazing material application operation for forming the second brazed portion Bb, meanwhile, is performed in a state where the base portion 60 is not yet covered by the cover portion 61, and therefore the restrictions described above do not apply, meaning that the brazing material can be applied from an appropriate direction. Note that the brazing material is preferably applied to the second concave surface portion 25b corresponding to the concave surface portion 25'.

Following the brazing material application operations described above, the brazing material is heated and melted using a heating furnace. At this time, some of the melted brazing material for forming the first and second brazed portions Ba, Bb advances into the first and second gaps C1, C2. Further, when the brazing material is heated and melted, a part thereof can be caused to pass through the minute gaps between the inner peripheral surfaces of the first and second holes 11, 62 and the outer peripheral surface of the heat transfer tube 2 so as to advance to the uppermost portion of the outer peripheral surface of the heat transfer tube 2 and positions therebeyond (when the brazing material is heated and melted, not all of the molten brazing material advances downward, and a part thereof also advances upward from the brazing material application part). Thus, even though the concave surface portion 25' to which the brazing material is applied is not positioned in the uppermost portion of the heat transfer tube 2, the molten brazing material can be caused to flow around the entire circumference of the outer peripheral surface of the heat transfer tube 2.

By implementing the series of processes described above, the heat exchanger HE can be manufactured appropriately.

With the heat exchanger HE according to this embodiment, the following effects are obtained.

The outer surfaces of the tube expansion portions 20 of the respective heat transfer tubes 2 are pressed against the inner peripheral surfaces of the first holes 11 provided in the side wall portion 10 of the case 1, and therefore the heat transfer tubes 2 can be brazed appropriately so that little or no play exists between the heat transfer tubes 2 and the first holes 11. Meanwhile, the brazing material of the first brazed portions Ba advances into the first gaps C1 formed between the outer surface of each of the tube expansion portions 20 and the inner peripheral surface of the first hole 11, and therefore the brazed surface area between the side wall portion 10 and the heat transfer tube 2 can be increased. Furthermore, the brazing material can be caused to flow around to the inner surface side of the side wall portion 10 through the plurality of first gaps C1 so that the additional brazed portion Ba' is also provided (see FIG. 7). As a result, improvements can be achieved in the strength by which the heat transfer tubes 2 are brazed to the case 1 and the reliability with which the heat transfer tubes 2 are attached.

Further, at least one first concave surface portion 25a (corresponding to the concave surface portion 25') among the plurality of first concave surface portions 25a is positioned in the outside peripheral surface portion Sa of the outer peripheral surface of each heat transfer tube 2, and therefore, when the brazing material forming the first brazed portions Ba is applied to the heat transfer tubes 2 during the process for manufacturing the heat exchanger HE, as described above, the brazing material can be applied easily to the first concave surface portion 25a (corresponding to the concave surface portion 25') from the outside of the case 1. Hence, difficulty can be eliminated from the brazing material application operation, leading to an improvement in productivity and a reduction in manufacturing cost. The brazing material application operation may be performed either manually or mechanically using a robot, and therefore mechanization of the brazing material application operation can be promoted.

Meanwhile, the basic configuration of the structure for attaching the header portion 6 (the base portion 60) to the heat transfer tube 2 is similar to that of the structure for attaching the heat transfer tube 2 to the side wall portion 10. Therefore, the strength with which the header portion 6 is brazed to the heat transfer tube 2 and the fixing strength achieved by tube expansion can both be increased. Moreover, the tube expansion process within the process for attaching the header portion 6 to the heat transfer tube 2 is performed simultaneously with the tube expansion process for attaching the heat transfer tube 2 to the side wall portion 10. As a result, the operation to manufacture the heat exchanger HE can be performed easily, enabling a reduction in manufacturing cost.

The present invention is not limited to the content of the embodiments described above, and the specific configurations of the respective parts of the heat exchanger according to the present invention may be freely subjected to various design modifications within the intended scope of the present invention. The specific configurations of the respective processes of the manufacturing method for a heat exchanger according to the present invention may be modified freely within the intended scope of the present invention.

The heat transfer tube is not limited to a meandering shape, and a tube body having a U shape, a straight tube shape, a spiral shape, or the like, for example, may be used instead. There are no limitations on the specific shape of the heat transfer tube. A heat transfer tube having an elliptical cross-section or the like may also be used. There are likewise no specific limitations on the number, arrangement, and so on of the heat transfer tubes.

The heat exchanger according to the present invention is not limited to use in a water heater. High-temperature exhaust gas, for example, may be used instead of combustion gas as the heating medium.

The plurality of segments of the divided punch used in the manufacturing method for a heat exchanger according to the present invention are not limited to four segments, and a divided punch having two segments, three segments, or the like may be used instead. There are no specific limitations on the number of segments. Accordingly, the numbers of first concave surface portions and second concave surface portions provided in each heat transfer tube are also not limited to four. Further, the plurality of segments of the divided punch are not limited to a configuration in which a single member is separated by slits, and the plurality of segments may be configured as separate members.

The invention claimed is:

1. A heat exchanger comprising:
   a case into which a heating medium is supplied, the case having a side wall portion in which a plurality of first holes are provided;
   a plurality of heat transfer tubes housed in the case and passed through the plurality of first holes so that respective end portions thereof are drawn out to the exterior of the case;
   header portions attached respectively to the end portions of the plurality of heat transfer tubes so that gaps are formed between the header portions and the side wall portion;
   a plurality of first brazed portions by which the plurality of heat transfer tubes are bonded to peripheral edge portions of the plurality of first holes;
   a tube expansion portion provided on each of the heat transfer tubes so that an outer surface thereof is pressed against an inner peripheral surface of the first hole; and
   a plurality of first concave surface portions provided in the outer surface of the tube expansion portion so as to form first gaps, which connect a inside of the side wall portion to an outside of the side wall portion and into which brazing material of the first brazed portions advances, between the outer surface of the tube expansion portion and the inner peripheral surface of the first hole, wherein
   an outer peripheral surface of each heat transfer tube, when the side wall portion is seen from the front, is divided into an inside peripheral surface portion near a width direction center of the case and an outside peripheral surface portion on an opposite side thereto, and at least one of the plurality of first concave surface portions is positioned in the outside peripheral surface portion.

2. The heat exchanger according to claim 1, wherein the respective end portions of the plurality of heat transfer tubes are arranged in two vertical columns with gaps therebetween in a vertical height direction of the case, the two vertical columns being provided in a staggered arrangement so that positions thereof deviate from each other in the vertical height direction, and at least one of the plurality of first concave surface portions is positioned below an uppermost portion and above an outermost end portion of the outside peripheral surface portion.

3. The heat exchanger according to claim 1, wherein the tube expansion portion includes first and second step portions that are positioned respectively on the inside and the outside of the side wall portion so as to sandwich the side wall portion in an axial length direction of the heat transfer tube and that engage with the side wall portion, and each of the first concave surface portions extends to respective outer surfaces of the first and second step portions.

4. The heat exchanger according to claim 1, wherein the header portion includes a plurality of second holes into which the respective end portions of the plurality of heat transfer tubes are inserted, the header portion being bonded to the end portions via second brazed portions, the tube expansion portion is provided such that the outer surface thereof is also pressed against an inner peripheral surface of the second hole, and the heat exchanger further comprises second concave surface portions provided in the outer surface of the tube expansion portion so as to form second gaps, into which brazing material of the second brazed portion advances, between the outer surface of the tube expansion portion and the inner peripheral surface of the second hole.

5. The heat exchanger according to claim 1, wherein each of the heat transfer tubes has a meandering shape.

6. The heat exchanger according to claim 1, wherein the heating medium is combustion gas.

* * * * *